W. H. WHEELER.

Assignor to THE ECLIPSE WINDMILL COMPANY.

Windmill.

No. 9,493. Reissued Dec. 7, 1880.

WITNESSES

P. Walter Fowler,

W. Blackstock.

INVENTOR

Wm. H. Wheeler.

By Le. Hill his ATTORNEY

N. PETERS, Photo-Lithographer, Washington, D. C.

UNITED STATES PATENT OFFICE.

WILLIAM H. WHEELER, OF BELOIT, WISCONSIN, ASSIGNOR TO THE ECLIPSE WINDMILL COMPANY, OF SAME PLACE.

WINDMILL.

SPECIFICATION forming part of Reissued Letters Patent No. 9,493, dated December 7, 1880.

Original No. 156,195, dated October 20, 1874. Application for reissue filed November 20, 1879.

*To all whom it may concern:*

Be it known that I, WILLIAM H. WHEELER, of Beloit, in the county of Rock and State of Wisconsin, have invented a certain new and useful Improvement in Windmills; and I do hereby declare the following to be a full, clear, and exact description of the same, reference being had to the accompanying drawings, forming part of this specification, in which—

Figure 1:
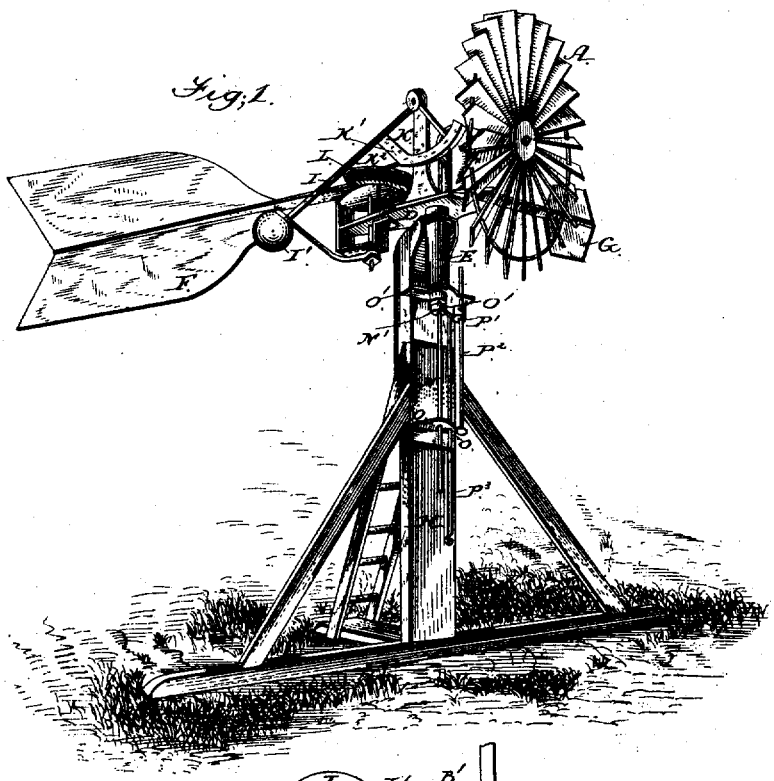
Figure 2:
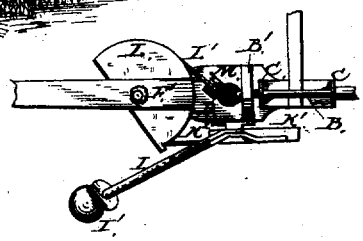

Figure 1 is a perspective view of the apparatus complete; Fig. 2, a partial top view, showing chiefly the counter-weight; and Fig. 3, a partial side view.

Similar letters of reference in the several figures denote the same parts.

The first part of this invention relates to that class of mills which have a revolving vertical wind-wheel and a pivoted tail-vane so constructed and operating that the wheel is thrown out of action by swinging it around laterally till its plane of rotation comes parallel to the plane of the tail-vane and in line with the direction of the wind, while as the wind abates a weight tends to restore the wheel to its normal position for action. In this class of wind-wheels the usual mode of operation is either to swing or turn the head laterally, so as to bring the face of the wheel slightly oblique to the wind, whereupon the wind, having the proper leverage upon the wheel, will force it around laterally till its plane of rotation comes substantially parallel to the plane of the tail-vane, in which position the wheel is no longer capable of action, or else to move the tail-vane slightly out of line with the wind, whereupon the wind, if strong, will swing the whole head so as to bring the tail-vane in line with the wind again and bring the wheels slightly oblique to the wind, and then, having the proper leverage upon the wheel, will force it around laterally out of action in the same manner as above described. When the wind sufficiently abates, the weight, overcoming the deflecting force, restores the wheel at once to its normal position for action, with its axis in line with and its face at right angles to the tail-vane. Wheels of this class have heretofore been liable to the objection that in their operation, when the wind was not strong enough to overcome the gravity of the weight, the wheel would not be deflected at all, but would continue to work with its face presented to the full force of the air-currents, and when, on the other hand, the wind became strong enough to overcome the resistance of the weight, the wheel, if it began to veer at all, would at once veer through the whole range of its lateral movement, and, if permitted to do so, go out of action altogether by assuming a position parallel to the tail-vane.

The principle of my invention, so far as relates to this part of it, may be stated as follows, viz: so constructing this class of windmills that the force with which the wheel resists the deflecting action of the wind upon it shall vary in direct proportion to the distance of said wheel from its normal position at right angles to the line of the tail-vane.

The advantage of so constructing the mill is, that when a slight deflection of the wheel will sufficiently relieve it this deflection will of itself increase the resisting force till it balances the deflecting force, and the two equal forces, acting in opposite directions upon the wheel, will hold it steadily in the exact position required. If, then, the wind decreases, the resisting force will overcome the deflecting force and the wheel will swing into the wind till the two forces balance each other again, and, in like manner, if the wind increases, the deflecting force will overcome the resisting force and will swing the wheel out of the wind till the two forces balance each other. The wheel thus automatically adjusts itself to the varying force of the wind, so as to run regularly with substantially uniform speed and power, using the full effective force of the wind, but preserving itself from accident and injury in case of gales or sudden squalls.

The means by which I prefer to apply this principle in practice consist in combining with the wind-wheel and pivoted tail-vane a weight of varying resistance to counteract the deflection of the wheel; and this part of my invention consists, first, in the application of the principle to said class of windmills; and, secondly, in the mechanical devices by which said principle is so applied.

The second part of my invention consists in combining with the pivoted tail-vane a weight or weighted arm arranged at one side of the vertical and horizontal axes of the wind-wheel, for the purpose of counteracting the lateral strain upon the vertical axis of the wind-wheel when the latter is carried obliquely to the wind; and the third part of the invention consists in combining the wind-wheel, tail-vane, and weight or weighted arm with a sector, substantially as herein set forth.

In the accompanying drawings the vertical axis of the wind-wheel is shown composed of a head, D, with a tube, E, projecting from its under side. It is supported upon the tower or standard H so as to rotate freely by inserting the tube in the lateral brackets O′, the upper bracket serving as a guide and the lower one as a step for the tube.

A is the wind-wheel, and B its shaft, having bearings in the upright C of the vertical axis in front of the tube.

G is the wind-vane or wind-gage, projecting laterally from the vertical axis, and F is the main vane or rudder, pivoted or hinged to the head in rear of the tube E, as shown, and provided with a grooved segment, L, at its pivoted point above the head.

The segment is provided with stops upon its under side—one to arrest its lateral movement toward the side vane when it has reached a position parallel therewith, as hereinafter described, and the other to arrest its return movement when its longer axis is in line with the axis of the wind-wheel.

N is the pitman for transmitting the power of the wheel, connected by a wrist-pin to the disk B′ of the wheel-shaft. It is made angular transversely and extends down through the tube E, being guided in its movements by a bracket, O′, attached to the tower, and an angular opening formed in the bottom of the tube. It is jointed within the tube, so that its upper portion shall conform to the movements of the disk B′, and its lower portion moves in a straight line.

L′ is a cord secured to that corner or edge of the grooved segment next the side vane, which, after passing over a grooved pulley, M, mounted upon the vertical axis, extends down through the tube E and is fastened to a grooved collar, N′, adapted to slide freely upon the pitman. The cord also passes through an opening in the bottom of the table near the opening through which the pitman works.

By constructing the pitman in angular form transversely and guiding it through a corresponding opening in the bottom of the tube, and by connecting the operating-cord to a collar adapted to slide but not to rotate upon the pitman, such cord is prevented from being twisted or wound upon the pitman by the rotation of the vertical axis.

$P^3$ is the operating-rod, extending upward through the lower bracket, and provided with a lateral forked clutch, P, to embrace the grooved collar. This rod is guided by an eye, P′, running loosely upon the vertical rod $P^2$, connecting the two lower brackets.

I is a weighted lever, pivoted at one end to an upright, K, arranged upon the head D at one side of both the tube E and horizontal axis of the wind-wheel. This arm is provided at its pivoted point with a grooved sector, K′, and to its front end a cord, $K^2$, is secured, so as to extend back within the groove and fasten to the corner or edge of the segment. By this means the weighted arm is connected to the tail-vane eccentrically to its major axis, and is also arranged eccentrically to the vertical and horizontal axes of the wind-wheel.

Figure 3:
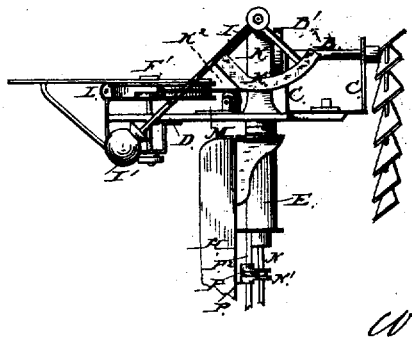

The arc of the sector is so arranged with reference to the weighted arm and standard K as to guide the cord or chain $K^2$ within the groove of the arc and segment of the tail-vane as such arc and segment are turned on their pivots. In its normal position the arm that supports the weight inclines downward and outward, as shown in Figs. 1 and 3, so that any force which raises the weight toward a horizontal position proportionately increases its leverage and the power which it exerts upon the wind-wheel by means of the sector and cord.

When the wind, becoming a little too strong, begins to deflect the wheel, the movement of the wheel raises the weight, increasing its leverage until it counteracts the deflecting force, and holds the wheel steadily in action, but somewhat oblique to the line of direction of the wind. If the wind still increases, it moves the wheel to a slightly more oblique position, and the weight, rising further, again counteracts the deflecting force and holds the wheel to its work, and so on until, under the influence of a strong gale, the wheel will be deflected nearly or entirely out of the wind. As the wind abates, the weight will gradually bring the wheel back to its original position, holding it at work from point to point, wherever the deflecting force of the wind and resisting force of the weight equal each other, as above described.

The weight I′ is made adjustable upon its arm in any convenient manner, for the purpose of regulating the force of the wind required to swing the tail-vane, and therefore determining the speed at which the wheel shall rotate for transmitting its power to the mill or other machinery. When the horizontal axis of the wind-wheel is carried out of line with the axis of the tail-vane, the two stand at an angle to each other upon that side of the vertical axis or tube E opposite to the eccentric weight. The effect of this is to produce a lateral strain upon the vertical axis and the parts connected therewith, because the force of the wind is exerted laterally upon the wheel and vane. The eccentricity of the weighted arm counteracts this strain and prevents injury to the vertical axis and the parts mounted thereon. As the angle of the wheel and vane decreases under a stronger wind, the lateral strain becomes greater upon the vertical axis; but the decrease of such angle raises the weight higher, and therefore increases its leverage to counteract the strain.

By operating the rod $P^3$ the tail-vane may be swung around to a greater or less degree while the wheel is in operation, or it may be swung around parallel to the wheel to bring the latter to a state of rest. The parts for effecting this operation by hand and for preventing the twisting of the cord K, however, form the subject-matter of another patent, granted to me February 3, 1874, No. 147,213, and are not claimed herein.

Having thus described my invention, what I claim is—

1. A weight of varying resistance pivoted at one side of the horizontal axis of the tail-vane, and at an angle with it, in combination with the pivoted tail-vane or rudder and wind-wheel, substantially as described, and for the purpose set forth.

2. The combination of the sector K′ with the weighted arm and tail-vane, for increasing the force or leverage of the weighted arm in proportion to the increased strain upon the vertical axis of the wind-wheel, substantially as specified.

3. The combination of a deflecting wind-wheel, a pivoted tail-vane, and means for resisting the deflection of the wheel out of the wind with a variable force proportionate to the extent of such deflection, substantially as described.

4. The combination of a deflecting wind-wheel, a pivoted tail-vane, and a weight of varying resistance, for the purposes herein set forth.

5. A weight of varying resistance pivoted above the mill-head so as to turn with the turn-table, in combination with the pivoted tail-vane or rudder and wind-wheel, substantially as described, for the purpose set forth.

WILLIAM H. WHEELER.

Witnesses:
H. V. DEARBORN,
CLINTON BABBITT.